United States Patent [19]

Stanley

[11] Patent Number: 4,796,332
[45] Date of Patent: Jan. 10, 1989

[54] CONSTRICTING AND FASTENING APPARATUS

[75] Inventor: Thomas R. Stanley, Downers Grove, Ill.

[73] Assignee: Teepak, Inc., Oak Brook, Ill.

[21] Appl. No.: 85,592

[22] Filed: Aug. 13, 1987

[51] Int. Cl.[4] ............................................. A22C 11/12
[52] U.S. Cl. ......................................................... 17/34
[58] Field of Search .................................. 17/34, 49, 33

[56] References Cited

U.S. PATENT DOCUMENTS

| | | | |
|---|---|---|---|
| 2,325,769 | 8/1943 | Haag | 17/34 |
| 3,237,290 | 3/1966 | Frank | 29/243.57 |
| 3,306,184 | 2/1967 | Hanau | 100/10 |
| 3,553,769 | 1/1971 | Myles et al. | 17/49 |
| 3,583,056 | 6/1971 | Klenz | 29/243.57 |
| 3,621,513 | 11/1971 | Kupcikevicius | 17/41 |
| 3,919,739 | 11/1975 | Kawai | 17/33 |
| 4,100,716 | 7/1978 | Barroso | 53/138 |
| 4,458,402 | 7/1984 | Evans et al. | 29/243.56 |
| 4,694,537 | 9/1987 | Kollross | 17/34 X |

FOREIGN PATENT DOCUMENTS 770459 10/1980 U.S.S.R. .

Primary Examiner—Willie G. Abercrombie
Attorney, Agent, or Firm—William J. Crossetta; Michael L. Dunn

[57] ABSTRACT

This invention relates to an apparatus for constricting and fastening flexible tubular material along its longitudinal axis having particular utility in the food processing industry such as sausage casings. The apparatus circumferentially constricts and gathers flexible tubular material about its longitudinal axis by reciprocally moveable co-acting gates which comprise means for urging a pliable fastener about the gathered flexible material.

15 Claims, 3 Drawing Sheets

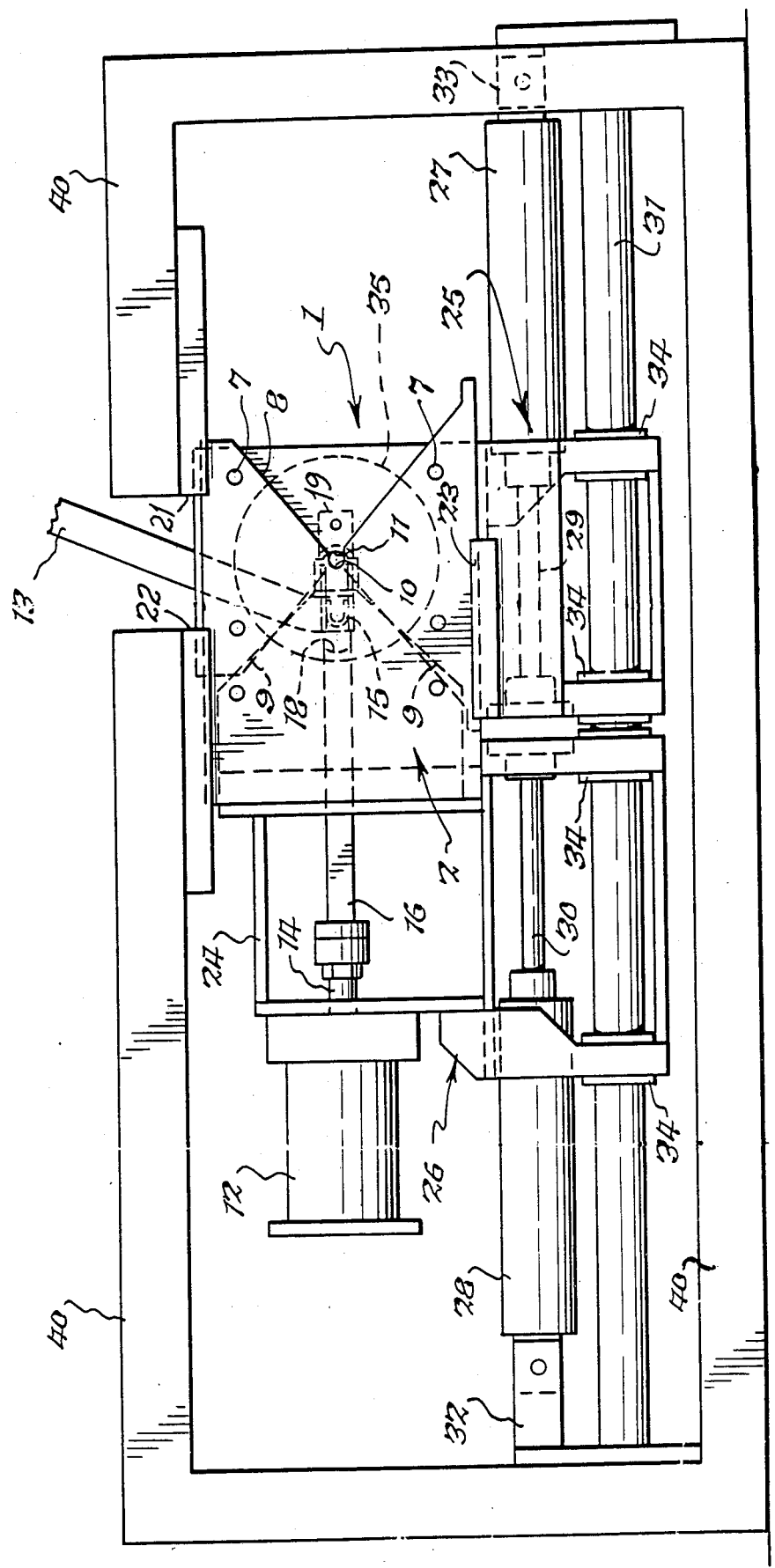

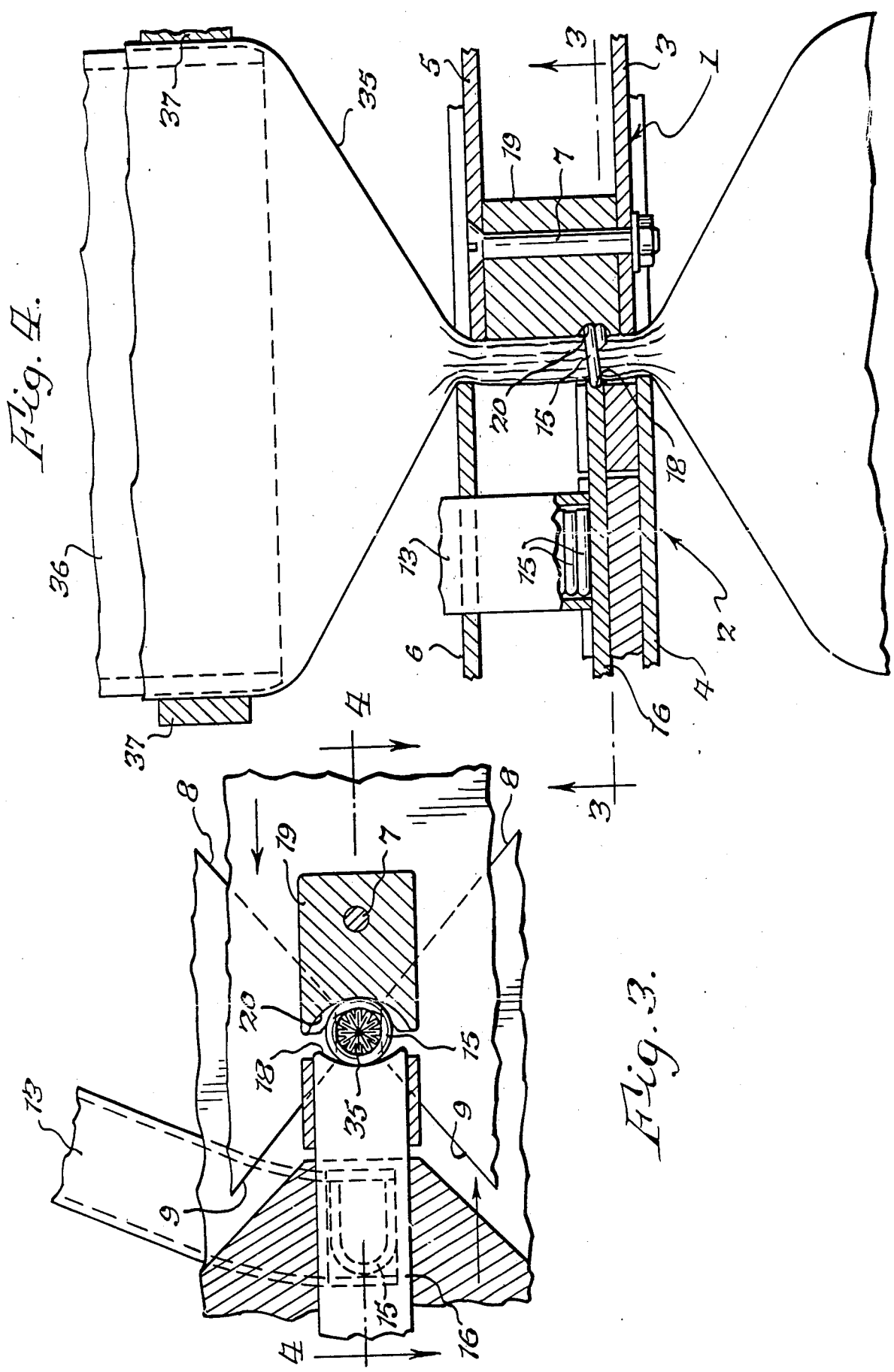

4,796,332

CONSTRICTING AND FASTENING APPARATUS

FIELD OF THE INVENTION

This invention relates generally to an apparatus for circumferentially constricting flexible tubular material and fastening the constricted tubular material in a combined action. The invention has utility in any instance wherein flexible tubular material must be constricted and fastened but has particular utility in the food packaging industry wherein tubular casings such as, for example, sausage casings are filled with meat products which casings must be gathered and fastened somewhere along their length including at either or both ends. The means of the invention provides for utilizing various pliable fastening means such as wire twisting means, plastic fastening means, and compression clip fastening means.

DESCRIPTION OF THE PRIOR ART

The use of flexible tubular casings to package materials is widely practiced in multiple industries. For example, tubular casings are used to package various epoxy compositions by the adhesives industry; are used to package sand and a multiplicity of other granulated or powdered products in the construction industry; and have been used to package cheese, meat, and various emulsified, particulate and mixed food products in the food industry. Perhaps the most important utility, however, is in the meat food products industry wherein flexible tubular casings are used to package multiple different types of sausages, hams, and related meat products.

In one typical operation of a sausage stuffing process, as discussed in U.S. Pat. No. 3,553,769, shirred (gathered) sausage casing is arranged over a stuffing horn with a closed end being proximate the filling end of the stuffing horn. A meat emulsion is forced through the stuffing horn into the casing and against the closed end of the casing such that the casing is stuffed as it is being deshirred from the horn. At intervals in the length of the casing, stuffing is interrupted, the casing is constricted, and a fastener is attached so as to produce individual sausage units. Another typical method is disclosed in U.S. Pat. No. 3,919,739 wherein a continuous band casing is intermittently brought to a stuffing horn by a carrier means, the casing is stuffed, and the ends are fastened to produce the individual sausage unit. Though the apparatus and process described in each of the aforesaid prior art patents contain major differences including the type of meat product being packaged, both have commonality in requiring the constricting, gathering, and fastening of the flexible casing being stuffed.

In the prior art, gathering and fastening of flexible tubular casing have typically been considered to be separate and distinct functions and accordingly have commonly been achieved with separate and distinct apparatus. U.S. Pat. No. 3,583,056 describes typical means used for gathering and applying a u-shaped clip around a flexible sausage casing. Therein, a pair of opposed side plates, pivotably secured at a common point on a fixed u-clip die support, co-act to circumferentially engage, constrict, and gather the stuffed flexible sausage casing. At its fully constricted position, the pivoting gate assembly defines a circular passageway through which the gathered casing extends. The clipping apparatus itself is a separate unit from the gate assembly, though when in a closed position the gates also define a verticle groove which receives a clip from the immobile clipping apparatus for transport to the site of the gathered casing. The problems associated with an apparatus of this nature are very apparent to even those of little expertise in the art. The criticality of alignment of the pivoting gates to repeatedly, reciprocally define a groove of such sufficient tolerance to allow trouble-free operation and the inevitable presence of foreign mater from the stuffing process, has represented a significant problem and such machinery is known as frequently jamming.

U.S. Pat. No. 3,237,290 describes an apparatus for helically wrapping a fastener around a twisted gathered flexible casing. Therein, a fixed lower clip die, co-acts with a reciprocally movable upper die housing to bend a u-shaped clip in helical wrap about a twisted gathered flexible casing. As is typical in the prior art, means necessary for constricting and gathering the tubular material are considered separately, the apparatus being designed to independently act upon material that has already been constricted and gathered. Again, as with U.S. Pat. No. 3,583,056, the clipping device is immobily fixed to the frame of the apparatus and a vertical groove is intermittently provided to transport the clip from the clipping device to the site of the gathered casing.

U.S. Pat. No. 4,100,716 describes an improvement to an apparatus for applying a u-shaped clip to a gathered flexible casing. Therein, is described the typical clipping device utilized in the prior art wherein an immobile clipping device fixed to the frame of the apparatus supplies a single u-shaped clip to an intermittently displaceable vertical clip track (groove) which clip is then moved to the site of the gathered casing and compressed around the casing by being forced against a stationary die, the improvement in this patent being to the inclusion of a small bar in the die adapted to dislodge the closed clip from the stationary die.

An object of the instant claimed invention is to provide a combined means for constricting and gathering flexible tubular material and applying a pliable fastener about the constricted and gathered material.

Another object of the invention is to provide an improved fastener indexing and positioning mechanism particularly useful with u-shaped clips of various sizes.

Still another object of the invention is to provide an improved gathering and fastening mechanism having a simple and unique construction which is economical to manufacture, easy to use, and has a reduced incidence of jamming.

These and other objects, advantages, and features of the invention will be set forth in the detailed description which follows:

BRIEF DESCRIPTION OF THE DRAWINGS

In the detailed description which follows, reference will be made to the drawings comprised of the following figures:

FIG. 2 is a side elevational view, with gates closed, of a gathering and fastening apparatus of the invention.

FIG. 3 is an enlarged fragmentary view of the apparatus of FIG. 2, taken generally along line 3—3 of FIG. 4, with parts broken away.

FIG. 4 is a top sectional view of the apparatus of FIG. 2, taken generally along line 4—4 of FIG. 3, with parts broken away.

SUMMARY OF THE INVENTION

Figure 1:
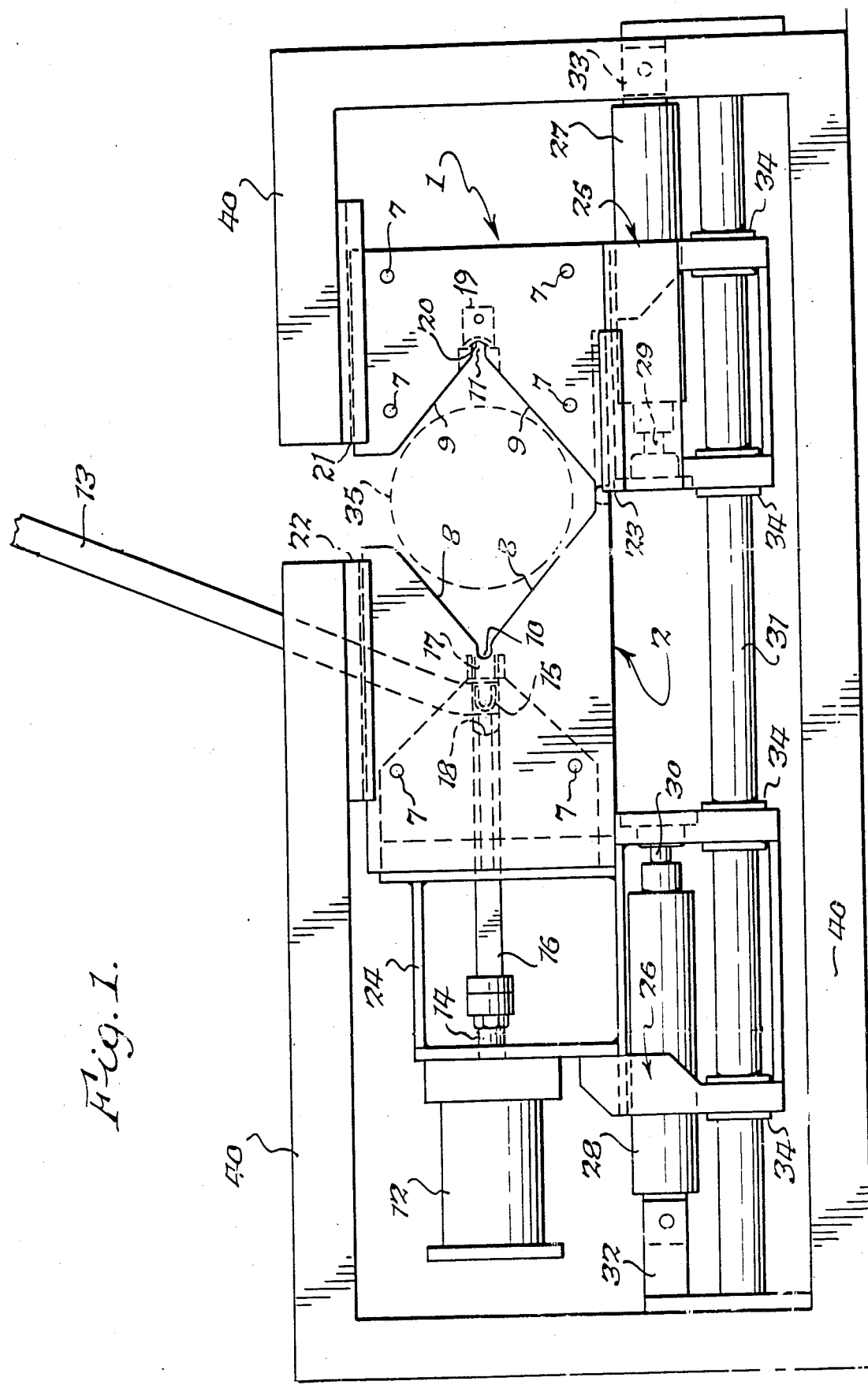
FIG. 1 is a side elevational view, with gates open, of a gathering and fastening apparatus of the invention.

The invention provides an apparatus for constricting and gathering flexible tubular material and applying a pliable fastener therearound, wherein co-acting, reciprocally movable means for circumferentially constricting flexible tubular material and gathering the constricted material about the longitudinal axis additionally comprise synchronously reciprocating co-acting means for urging a pliable fastener around the constricted and gathered material. Thus, a single apparatus performs a combined function allowing simplified control over the varying thicknesses and diameters of tubular casing without equipment modification. In a preferred mode of the invention, improved means are provided for extracting a closed clip from a clip die.

DESCRIPTION OF THE PREFERRED EMBODIMENTS

Referring to the drawings generally, there is shon an apparatus comprising four main sections: a tubular material constricting means comprising two or more gates which co-act to constrict and gather the tubular material about the longitudinal axis of the tube, at a predetermined point; a fastener delivery means which acts to deliver the fastener to the constricted and gathered tubular material; a fastener supply means which acts to supply the fastener for delivery by the fastener delivery means; and a fastener fixing means, which co-acts with the fastener supply means to fix the fastener on the constricted and gathered tubular material.

In the drawings the tubular material constricting means comprises reciprocally movable right gate 1 and left gate 2, having complementary constricting surfaces 9 and 8, respectively. The surfaces are configured such that as the gates move toward each other the surfaces constrict sausage casing 35, extending from stuffing horn 36, to the area defined by the complementary apexes 10 and 11 of the contricting surfaces. The sausage casing is retained on stuffing horn 36 by horn clamp 37 and the gates are cooperatively retained in position by upper support channels (21,22) affixed to main frame 40. Gate 1 is affixed with lower support bracket 23 to right gate carrier 25 which in turn is slidably mounted to guide bar 31 to facilitate right to left reciprocal movement. Gate 2 is affied with ram sub-frame 24 to left gate carrier 26 which is also in turn slidably mounted on guide bar 31 to facilitate right to left reciprocal movement. Reciprocal movement of the gates can be by coupled means, or, as preferred, by independent means utilizing separate power sources. Reciprocal movement of the gates in the configuration of the drawing is through separate power sources comprising right gate pneumatic cylinder 27, which extends and contracts piston 29 which in turn engages carrier 25 for left to right reciprocal movement of gate 1; and, left gate pneumatic cylinder 28 which extends and contracts piston 30, which in turn engages carrier 26 for left to right reciprocal movement of gate 2.

Pneumatic cylinder 27 is affixed to main frame 40 by pivotal attachment yoke 33 while pneumatic cylinder 28 is affixed to main frame 40 by pivotal attachment yoke 32. Guide bar 31 is affixed at each end to main frame 40 and each of carriers 25 and 26 are slidably mounted to guide bar 31 through slide bearings 34 which facilitate left to right reciprocal movement of the carriers.

The position of the gates relative to each other is generally arranged such that they intermesh or reciprocate in closely proximate, parallel planes. Tubular material, extending through and generally perpendicular to the parallel planes of reciprocation of the gates will be constricted by forceable contact with the gates, occasioned by the change in area defined by the configuration of the complementary constricting surfaces of the gates as they move toward each other in their parallel planes, and is gathered at the confluence of opposing constricting surfaces at the apexes of such surfaces. Typically, only two gates are necessary for the constricting and gathering operation but more may be used if so desired. Typically, the gates will be maintained in parallel vertical planes, but the positioning of the planes is generally dependent upon the configuration of the apparatus from which the tubular material is being received. Generally, when the tubular material is a food stuffed material, such as for example stuffed sausage casing, the stuffing machinery is configured for horizontal extrusion of the stuffed casing and the gates would be in generally vertical parallel planes to receive such casing. The gates have been found to be operable regardless of the direction of their reciprocating action in their parallel plane. Thus, gates configured in parallel vertical planes reciprocating vertically, horizontally, or at various angles therebetween are contemplated as within the invention. In the sausage casing industry, I have generally found that when the stuffed casig is extruded horizontally, it is preferred to mount the gates in vertical planes with horizontal reciprocating movement.

In the configuration of the drawings, particularly as can be seen in FIG. 4, gates 1 and 2 are arranged in such vertical planes that during their reciprocal movement they intermesh. In such arrangement the configuration of right gate 1 comprises a front right inner gate plate 3 and rear right gate plate 5, spaced apart by clip anvil 19 and additional spacers (not shown). The front and rear inner gates are secured together in parallel plane by gate plate bolts 7. Left gate 2 comprises front left outer gate plate 4 and rear left outer gate plate 6 spaced apart by spacers (not shown) and secured together in parallel planes by gate plane bolts 7. Each of gate plates 3, 4, 5 and 6 are in parallel planes, with the inner surface of gate plates 4 and 6 being spaced apart a greater distance than the outer surface of gate plates 3 and 5.

In the drawings, the fastener delivery means and fastener supply means are configured as being affixed to gate 2, while the fastener fixing means is affixed to gate 1, which is a preferred configuration of the apparatus of the invention. It is to be understood, however, that the fastener delivery means and fastener supply means can be affixed to any one or more gates which may be arranged in other configurations of the invention with the only practical limitation being that at the time of affixing the fastener to the constricted material, the fastener delivery means should be on the opposite side of the constricted material from the fastener fixing means for maximum efficiency.

In the drawings, particularly FIG. 1, the fastener delivery means is configured in its rest position wherein clip ram piston 14, of clip ram pneumatic cylinder 12 (affixed to ram sub-frame 24) is shown in the retracted position such that clip ram face 18 of clip ram 16, which is cooperatively engaged with ram piston 14, extends up to but not beyond the fastener delivery means. In the fastener delivery means engaged position, as depicted in FIGS. 2, 3 and 4, clip ram 16 extends through the terminal of clip feed magazine 13, of the fastener supply means, and a clip 15 has been slidably urged by clip ram face 18 from the fastener supply means, e.g. clip feed magazine 13, along clip ram shaft 17 to engage about the constricted sausage casing 35 and coact with the fastener fixing means.

The fastener fixing means comprises clip anvil 19 having a clip anvil face 20 configured to cause controlled deforming of a clip when coacted therewith. Thus, when clip 15 is mounted on the constricted casing and coacts with anvil face 20, the compression force by the clip ram urging the clip against the anvil causes the clip to deform and afix to the constricted sausage casing.

The fastener supply means can be any suitable means for supplying a clip to the constricted casing. In the depiction of the drawings, the fastener supply means comprises a tubular magazine configured to deliver a clip at its terminal with clip ram shaft 17 and into the shaft with each reciprocation of the clip ram. The clips may be spring or otherwise pressure loaded into the magazine, but in general use, the magazine is arranged vertically and the clips allowed to progress to the terminal by gravity. The clips are typically made of a deformable metal and may contain serations or the like on the surface contacting the casing to improve gripping.

Various modifications may be introduced into the details of the mechanisms shown and described without departing from the scope of the invention.

What is claimed is:

1. An apparatus for applying a pliable fastener around a tubular article constructed of flexible material comprising co-acting, reciprocally movable, means for circumferentially constricting a 360° arc of said tubular article to form a portion of circumferentially constricted flexible material gathered about the longitudinal axis of said tubular article, said co-acting means further comprising means synchronously reciprocating with said co-acting means, for urging a pliable fastener around said constricted portion of said material, and drive means for constricting said material and urging said pliable fastener.

2. The apparatus of claim 1 comprising first and second co-acting, reciprocally moveable, gate means for constricting said tubular material.

3. The apparatus of claim 2 wherein said first gate means comprises a means for urging a pliable clip about the circumferentially constricted tubular material.

4. The apparatus of claim 3 wherein said means for urging said clip further comprises means for deforming said clip about said constricted tubular material.

5. The apparatus of claim 1 wherein said fastener further comprises a gripping means.

6. The apparatus of claim 3 wherein said second gate means comprises a means for deforming a pliable clip urged about the circumferentially constricted tubular material.

7. The apparatus of claim 6 wherein said means for deforming comprises a contoured die means.

8. The apparatus of claim 3 wherein said second gate means comprises a contoured die means which co-acts with said first gate means for urging a clip, to bend and fasten said clip around the circumferentially constricted gathered flexible material.

9. The apparatus of claim 8 wherein said contoured die means is proximate the constricting surface of said gate means.

10. The apparatus of claim 9 wherein said clip urging means is proximate the constricting surface of said gate means.

11. The apparatus of claim 1 comprising first and second generally horizontally, reciprocally moveable, gate means for constricting said flexible material, said first gate means comprising means for urging a clip around the constricted material and said second gate means comprising die means for co-acting with the clip urging means to bend and fasten said clip around the constricted flexible material.

12. The apparatus of claim 11 wherein said first and second gate means have co-acting V-shaped constricting surfaces.

13. The apparatus of claim 12 wherein said gate means and clip urging means are activated by separate drive means.

14. The apparatus of claim 1 wherein said gate means and clip urging means are activated by separate drive means.

15. The apparatus of claim 1 wherein said drive means is pneumatic drive means.

* * * * *

UNITED STATES PATENT AND TRADEMARK OFFICE
CERTIFICATE OF CORRECTION

PATENT NO. : 4,796,332

DATED : January 10, 1989

INVENTOR(S) : Thomas R. Stanley

It is certified that error appears in the above-identified patent and that said Letters Patent is hereby corrected as shown below:

Column 6, claim 11, line 43, "The apparatus of claim 1" should read

-- The apparatus of claim 11 --.

Signed and Sealed this

Sixth Day of June, 1989

Attest:

DONALD J. QUIGG

Attesting Officer

Commissioner of Patents and Trademarks